CARRIER TELEPHONE SYSTEMS WITH CARRIER-SHIFT SIGNALING

Filed Sept. 27, 1957 3 Sheets-Sheet 1

INVENTOR
D. C. WELLER
BY R. B. Ardis
ATTORNEY

CARRIER TELEPHONE SYSTEMS WITH CARRIER-SHIFT SIGNALING

Filed Sept. 27, 1957 3 Sheets-Sheet 2

INVENTOR
D. C. WELLER
BY R. B. Ardis
ATTORNEY

March 8, 1960 D. C. WELLER 2,927,966

CARRIER TELEPHONE SYSTEMS WITH CARRIER-SHIFT SIGNALING

Filed Sept. 27, 1957 3 Sheets-Sheet 3

INVENTOR
D. C. WELLER
BY R. B. Ardis
ATTORNEY 2,927,966

CARRIER TELEPHONE SYSTEMS WITH CARRIER-SHIFT SIGNALING

David C. Weller, Lake Mohawk, N.J., assignor to Bell Telephone Laboratories, Incorporated, New York, N.Y., a corporation of New York Application September 27, 1957, Serial No. 686,738

8 Claims. (Cl. 179—15)

This invention relates generally to carrier telephone systems for use between central offices and more particularly, although in its broader aspects not exclusively, to the transmission of signaling information over carrier trunks in the so-called exchange area.

When a number of voice frequency telephone transmission lines are replaced by a single carrier trunk, each carrier channel must, if it is to be fully compatible with the associated switching equipment, be capable not only of carrying the same messages but also of passing the same form of signaling information as the voice channel it replaces. It should, in other words, accept voice messages and signaling information in the same form that they would have if they were impressed upon a metallic pair and reproduce both in substantially that same form at the other end of the line if need for alterations in the associated switching equipment is to be avoided.

Signaling in a telephone system may conveniently be divided into the two broad classifications of supervisory and control signaling. The first permits a subscriber or an operator to initiate a request for service, holds or releases a connection after it has been established, or recalls an operator on a previously established connection. The second permits information to be passed over the line to direct the establishment of a particular desired connection. Since, at least in the exchange area, the type of signaling that places the most stringent requirements on the transmitting system is the form of control signaling known as revertive pulsing, it is to revertive pulsing that the description of the present invention is primarily directed. The principles underlying the invention are, of course, applicable to other forms of signaling as well, particularly to others involving the rapid transmission of pulses in either one or both directions over the trunk.

Revertive pulsing between central offices owes its existence to the fundamental nature of certain types of central office switching equipment. Certain switching devices, notably panel selectors, are driven by their own power over a bank of terminals and signal their position at each step by producing a pulse as each terminal is passed over. The pulses are generated by a commutator that is part of the switching mechanism. Equipment at the originating or transmitting central office counts these pulses and stops the switch by means of a signal over the trunk when the desired position is reached. This method of signaling is known as revertive pulsing since an originating office controls the setting of switches in a terminating or receiving office by means of pulses which "revert" back over the trunk from the terminating office to the originating office. The originating office initiates only start and stop signals. In voice frequency trunks, all of these signals are usually transmitted over the trunk conductors by D.-C. techniques.

In a revertive pulsing arrangement, the transmission requirements are particularly severe from the standpoint of speed and signal-to-noise ratio. High transmission speed in both directions is necessary if the switching equipment at the terminating office is to stop at the desired connection, while a good signal-to-noise ratio is required to avoid the possibility of either central office receiving false signaling information. Neither requirement presents insuperable problems over a metallic pair, since the pulses themselves can be transmitted over the line in both directions on a D.-C. basis. In a carrier trunk, however, different techniques must be resorted to since D.-C. cannot conveniently be transmitted.

In the past, it has been customary to transmit signaling information between telephone control offices over a carrier trunk by either pulsing the amplitude or shifting the frequency of one or more tones which are either within or just outside of the voice frequency band and using them to amplitude-modulate the carrier in the same manner as do the regularly transmitted speech waves. While generally satisfactory for most purposes, such signaling arrangements still tend to fall short of the performance of a metallic voice frequency circuit for exchange area use from the standpoint of speed and signal-to-noise performance. The available bandwidth tends to be too limited for really high-speed pulse transmission, and any noise on the line necessarily tends to distort the signaling pulses and create the possibility of error. It might be possible to gain some advantage by frequency-modulating the carrier itself in order to transmit signaling pulses, but such an expedient would tend to introduce severe problems of interchannel crosstalk in systems having carrier frequencies that are not far removed from the voice range.

The principal object of the invention is, therefore, to increase the speed at which signaling pulses can be transmitted between central offices over a carrier telephone transmission system.

A closely related object is to improve signal-to-noise performance in transmitting signaling pulses between central offices over a carrier telephone system.

Another and more particular object of the invention is to improve both signaling speed and signal-to-noise performance in a carrier telephone signaling system without introducing troublesome crosstalk or extraneous tones into other carrier channels.

In its broader aspects, the invention takes the form of an arrangement for transmitting signaling information in pulse form over a carrier telephone transmission system between a pair of central offices by shifting each carrier selectively by an integral fraction of the interchannel carrier spacing which is sufficiently great to take it at least to the edge of the channel. In an exchange area carrier trunk having a number of equally spaced double-sideband carrier channels, in other words, means is provided in each channel to shift the carrier in response to signaling pulses by an amount substantially equal to $S/n$ where S is the carrier spacing between adjacent channels, $n$ is an integer greater than unity, and $S/n$ is equal to or greater than one-half of the bandwidth of each channel, each channel including the frequency space from the bottom of the lower to the top of the upper sideband.

In an exchange area carrier trunk, the invention permits signaling information in pulse form to be transmitted with equal facility in either direction between telephone central offices. Thus, in a revertive pulsing arrangement featuring the present invention, start and stop pulses are transmitted in one direction over each carrier channel and reverting pulses are transmitted in the other direction with at least the speed and signal-to-noise advantage of a direct metallic voice frequency trunk and with no objectionable crosstalk between channels even though the respective channels may be relatively low in the frequency spectrum. Carrier-shift signaling in accordance with the present invention does not, of course, prevent the transmission of additional signaling information between central offices by such methods as amplitude-modulation of the carrier with one or more tones either within or just outside of the voice band. Additional signaling information which does not have such stringent speed and signal-to-noise requirements may be transmitted in such fashion to supplement that transmitted by shifting the carrier frequency.

An important advantage offered by the present invention is that it permits single-sideband voice message transmission over each carrier channel even in the so-called "on-hook" condition. A need for such conversations sometimes occurs on a toll telephone circuit when the originating subscriber is talking to an operator. Were the operator to place the channel "off-hook," the subscriber would be charged for the call. In general, the carrier is shifted to the edge of the carrier channel or slightly beyond under such conditions and no additional signaling information is transmitted by amplitude-modulating the shifted carrier. The channel is available, therefore, for single-sideband transmission with but a slight deterioration in quality. Since such conversations never occur during the commercial part of a call, the slight deterioration in quality has no adverse effect on the overall quality of telephone service provided to the subscriber.

A more complete understanding of the invention may be obtained from a study of the following detailed description of a specific embodiment arranged to provide control signaling of the revertive pulsing type. In the drawings.

Figure 1:
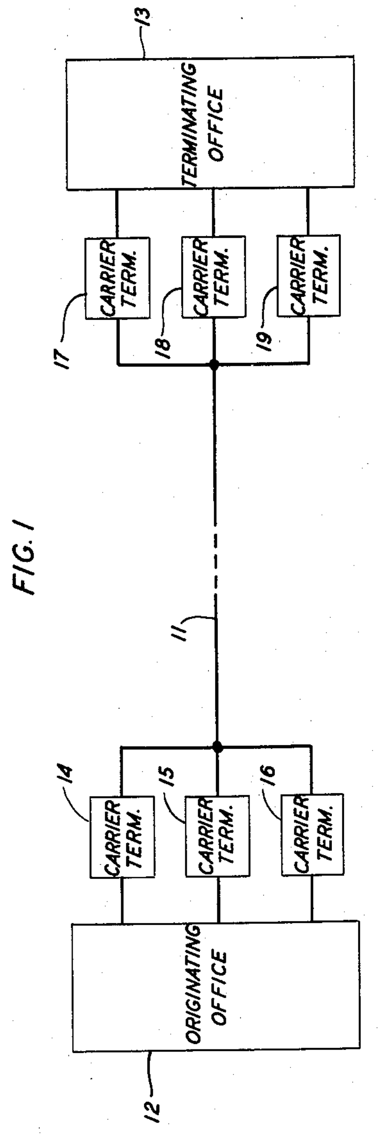
Fig. 1 is a very general block diagram of a carrier trunk which may employ the invention to advantage in providing revertive pulsing between a pair of central offices in the exchange area.

The general environment for the advantageous application of the invention is illustrated by the block diagram of Fig. 1, which shows in outline form an adaptation to exchange area use of the transistorized subscriber carrier telephone system disclosed in copending application serial No. 455,099, filed September 10, 1954, by the present inventor in conjunction with V. J. Hawks and E. K. Van Tassel, and in the present inventor's United States Patent 2,763,726, issued September 18, 1956. At opposite ends of a carrier telephone line or trunk 11 are an originating office 12 and a terminating office 13. At originating office 12, three carrier terminals 14, 15, and 16 provide three outgoing and three incoming carrier channels. Three corresponding carrier terminals 17, 18, and 19 are similarly connected at terminating office 13. For purposes of illustrating the principles of the invention, it is assumed that a call is to be made from a subscriber served by central office 12 to a subscriber served by central office 13. Under such conditions, in a revertive pulse signaling arrangement, the switching equipment at terminating office 13 is operated under the control of originating office 12.

Figure 2:
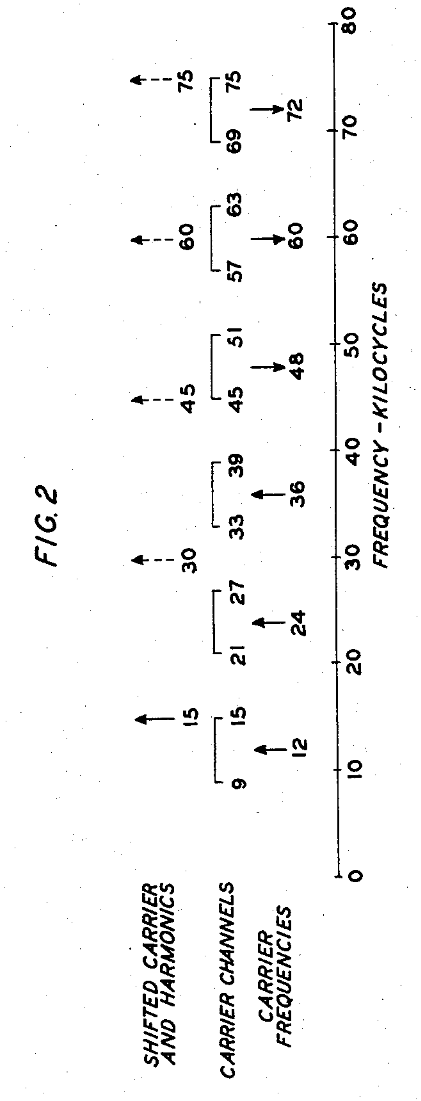
Fig. 2 is a diagram showing the distribution of carriers and message channels in the frequency spectrum in the system shown in Fig. 1.

The frequency distribution of the carriers and carrier message channels for the exchange area system of Fig. 1 is illustrated in the second and third lines of Fig. 2. In the third line, carriers of 12, 24, and 36 kilocycles are shown, by way of example, providing channels from left to right, while carriers of 48, 60, and 72 kilocycles are shown providing channels from right to left. This is the so-called grouped carrier distribution arrangement described in the above-identified copending application and facilitates the use of repeaters on the carrier line. Of the individual carrier terminals in Fig. 1, terminals 14 and 17 transmit on carriers of 12 and 48 kilocycles, respectively, and each receives the carrier frequencies transmitted by the other. Similarly, terminals 15 and 18 provide two-way transmission on carrier frequencies of 24 and 60 kilocycles and terminals 16 and 19 provide two-way transmission on carrier frequencies of 36 and 72 kilocycles. In all instances, transmission is on a double-sideband carrier-transmitted basis, and, since the voice band on the telephone plant is approximately from 300 cycles to 3 kilocycles, the individual carrier channels are as shown in the second line of Fig. 2.

The freedom from unwanted crosstalk offered by systems featuring the present invention is illustrated diagrammatically in the top line of Fig. 2. In accordance with the invention, signaling information in pulse form is transmitted over the carrier trunk illustrated in Fig. 1 by shifting the carrier of the channel concerned by an integral fraction of the interchannel spacing which is equal to at least half of the bandwidth of each channel. Each channel is arranged, in other words, with means to shift the carrier in response to signaling pulses by an amount substantially equal to $S/n$, where S is the carrier spacing between adjacent channels, $n$ is an integer greater than unity, and $S/n$ is equal to or greater than one-half of the bandwidth of each channel. Since it is the lowest carrier frequency that is most likely to have harmonics that will cause crosstalk in other channels, the lowest or 12-kilocycle carrier channel is the one dealt with in the example.

In the illustrated example, the interchannel carrier spacing S is 12 kilocycles and the bandwidth of each channel is 6 kilocycles. In order to provide the best quality of single-sideband transmission against an on-hook condition, a value which yields a value of $S/n$ as nearly equal one-half of the regular double-sideband channel bandwidth as possible is particularly advantageous. In the illustrated example, the preferred value of $n$ is 4, yielding a value of $S/n$ equal to 3 kilocycles. A carrier shift of 3 kilocycles in the lowest carrier channel thus satisfies the criteria of the invention and provides the desired amount of signaling speed and signal-to-noise advantage. It avoids, moreover, the crosstalk disadvantages which would necessarily be associated with small amounts of carrier shift. As illustrated in the top line of Fig. 2, when the carrier of the 12-kilocycle channel is shifted by 3 kilocycles to 15 kilocycles, the pertinent harmonics of the shifted carrier fall at 30, 45, 60, and 75 kilocycles. Since these harmonics all fall between channels, just at the edge of channels, or directly on top of other carriers, there is no important interference with the performance of any of the other channels in the system.

Other integral values of $n$ could have been chosen to illustrate the principles underlying the invention, although with some sacrifice in single-sideband transmission performance on those occasions when it is necessary to talk in the "on-hook" condition. A value of 3 provides a 4 kilocycle shift to 16 kilocycles, giving harmonics of 32, 48, 64, and 80 kilocycles, and a value of 2 provides a 6 kilocycle shift to 18 kilocycles, giving harmonics of 36, 54, and 72 kilocycles. In all embodiments of the invention it would, of course, be possible to shift the carrier downward rather than upward. The criteria of the invention would still be satisfied and most of the advantages of the invention would still be realized. While it thus falls fully within the scope of the present invention, shifting the carrier downward tends to cause a somewhat larger number of harmonics to fall within the operating region of the system. Such harmonics are not of frequencies which cause crosstalk but, other things being equal, it is generally more desirable to shift the carrier in the direction which causes the fewest number of harmonics to fall within the operating region of the carrier system.

Figure 3:
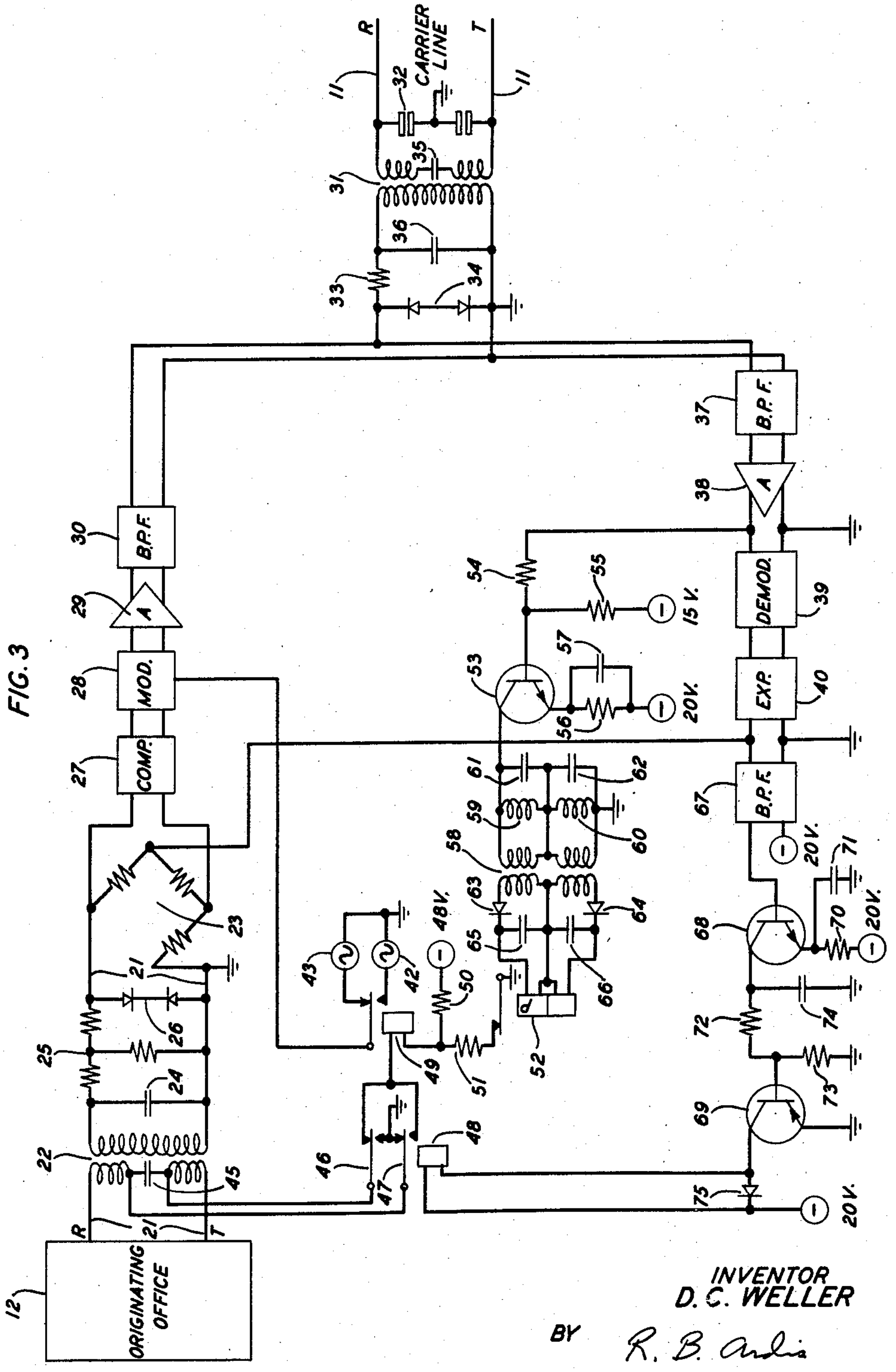
Fig. 3 is a detailed diagram of a carrier terminal embodying the invention used at the originating central office in the exchange trunk carrier system shown in Fig. 1.

Fig. 3 illustrates in detail one of the carrier terminals used at the originating central office 12 in the embodiment of the invention illustrated in Fig. 1. The other terminals are similar but operate, of course, on different carrier frequencies. A balanced bilateral voice-frequency transmission line or trunk 21 couples originating office 12 to the carrier terminal and is coupled through a transformer 22 to the terminals defining one arm of a four-terminal resistance bridge 23. Between bridge circuit 23 and transformer 22, one side of voice line 21 is grounded. Immediately to the right of transformer 22, a condenser 24 is connected across the line to attenuate frequencies above the voice band. A T-type resistance pad 25 is connected in series with the line to cooperate with a pair of avalanche breakdown diodes 26 in providing protection for succeeding apparatus from unduly high voltage surges. Diodes 26 are oppositely poled and connected in series across line 21. For more complete details concerning the high voltage protection circuit made up of diode pair 26 and resistance pad 25, reference is made to United States Patent 2,789,254, issued April 16, 1957, to D. W. Bodle and J. B. Hays, Jr.

An outgoing transmission path is provided in the carrier terminal shown in Fig. 3 by a compressor 27, a modulator 28, a transmitting amplifier 29, and a band-pass channel filter 30, all connected in tandem transmission relation. Channel filter 30 has, by way of example, a pass band of from 9 to 15 kilocycles. The input side of compressor 27 is connected to one pair of conjugate terminals of resistance bridge 23, while the output side of channel filter 30 is connected through a transformer 31 to the balanced carrier transmission line 11. Carrier frequency oscillations are supplied to modulator 28 from either one of two carrier oscillators 42 and 43 which will be discussed later in more detail. To the left of line transformer 31, one side of the carrier line is grounded.

Protection for the circuits to the left of transformer 31 against lightning surges on carrier trunk 11 is provided by a pair of carbon block high voltage protectors 32, a series resistor 33, and a pair of avalanche breakdown diodes 34. Carbon-block protectors 32 are connected in series across the balanced carrier line side of line transformer 31, and their common point is grounded. Resistor 33 is connected in series with the ungrounded side of the carrier line to the left of transformer 31. To the left of resistor 33, avalanche breakdown diodes 34 are oppositely poled and connected in series between the end of resistor 33 and ground. Currents below the carrier band in frequency are blocked by a condenser 35 connected in series between the two halves of the right-hand or balanced carrier line winding of transformer 31, while high frequency voltage surges are attenuated by a condenser 36 connected between the right-hand side of resistor 33 and ground. For more complete details of the operation of this high voltage protection circuit, reference is again made to the patent of D. W. Bodle and J. D. Hays, Jr.

In the carrier terminal illustrated in Fig. 3, a path for incoming signals from carrier line 11 is provided by a band-pass channel filter 37, a receiving amplifier 38, a demodulator 39, and an expandor 40. Channel filter 37 has, by way of example, a pass band of from 45 to 51 kilocycles. These units are all connected in tandem transmission relation, with the input terminals of channel filter 37 connected in parallel with the output terminals of channel filter 30 across the carrier line. The output side of expandor 40 is connected to the other pair of conjugate terminals of resistance bridge 23.

The portion of the carrier terminal of Fig. 3 that has already been described substantially duplicates apparatus found in the carrier treminals disclosed in the present inventor's above-identified patent and copending joint application. Since the present invention is concerned with exchange trunk signaling rather than with direct subscriber ringing, however, the remainder of the terminal is considerably different.

For revertive pulsing, it is necessary for the carrier equipment at originating office 12 to detect loop closure on voice trunk 21, to apply battery or short across the end of voice trunk 21 in response to signals received from the terminating office, and to effect battery reversal on voice trunk 21 in response to signals received from the terminating office. The carrier terminal illustrated in Fig. 3 must, in other words, be able to transmit two signaling states and be able to receive and utilize three signaling states. To accomplish the first of these purposes in accordance with the present invention, the illustrated terminal is arranged to transmit its normal carrier, e.g., 12 kilocycles, when the office termination of voice trunk 21 is a short circuit and to transmit a shifted carrier, e.g., 15 kilocycles, when the office termination of voice trunk 21 is a high impedance. To accomplish the others, the terminal is arranged to connect either battery or substantially a short circuit across the carrier terminal end of voice trunk 21, depending upon whether the received carrier is normal or shifted, and to reverse battery in response to a 200-cycle tone recovered from the incoming carrier wave.

In the carrier terminal illustrated in Fig. 3, the primary winding of voice line transformer 22 is divided into two equal parts which are separated by a series condenser 45. The ends of the divided primary winding nearest condenser 45 are connected to the respective armatures 46 and 47 of a battery reversing relay 48. Through these winding portions, the T or "tip" side of the line is connected to armature 46 and the R or "ring" side is connected to armature 47. Of the various contacts of battery reversing relay 48, the front contact of armature 46 is grounded, the front of armature 47 and the back contact of armature 46 are connected together through the operating coil of a monitoring relay 49 and a large resistor 50 to a negative 48-volt D.-C. source, and the back contact of armature 47 is grounded.

Monitoring relay 49 has a single armature which is connnected to supply carrier directly to modulator 28. The back contact of relay 49 is connected through carrier source 43 to ground and the front contact is similarly connected through carrier source 42 to ground. In the embodiment of the invention under consideration, carrier source 42 is what may be termed the normal carrier source and has an operating frequency of 12 kilocycles. Carrier source 43 is what may be called the shifted carrier source and has an operating frequency of 15 kilocycles.

The side of the operating coil of monitoring relay 49 connected to resistor 50 and the negative 48-volt source is also connected through a much smaller resistor 51 to the back contact of a polarized pulsing relay 52. The armature of pulsing relay 52 is grounded. Pulsing relay 52 is operated in response to shifts in the carrier received from the other end of the exchange trunk and is supplied from receiving amplifier 38 through a single-stage transistor amplifier and a frequency discriminator. The transistor amplifier includes a n-p-n junction transistor 53 having its base electrode connected through a resistor 54 to the ungrounded side of the output circuit of receiving amplifier 38. The base electrode of transistor 53 is also connected through a resistor 55 to a negative 15-volt D.-C. source, while the emitter electrode is connected through a resistor 56 to a negative 20-volt D.-C. source. Resistor 56 is bypassed at carrier frequencies by a condenser 57.

The collector electrode of transistor 53 is connected directly to the discriminator, the principal element of which is a transformer 58 having divided primary and secondary windings. A pair of coils 59 and 60 are connected across respective halves of the primary winding and a pair of capacitors 61 and 62 are connected, in turn, across the respective coils. The center-tap of the secondary winding of transformer 58 is connected directly to a center-tap on the operating coil of pulsing relay 52. One end of the secondary winding is connected through a diode 63 to the corresponding end of the operating coil of pulsing relay 52, while the other end of the secondary winding is similarly connected through a diode 64 to the other end of the operating coil. Both diodes are poled for easy current flow toward the relay winding. Finally, a pair of capacitors 65 and 66 are connected in parallel with respective halves of the operating coil of pulsing relay 52.

The frequency discriminator which has just been described from a structural standpoint is tuned to produce an output voltage of one polarity from a normally received carrier, e.g., a carrier of 48 kilocycles, and to produce an output voltage of the opposite polarity from a shifted received carrier, e.g., a carrier of 51 kilocycles. Pulsing relay 52 is polarized, however, and its contacts open in response to the normal carrier but remain closed in response to shifted carrier. For this reason, resistor 51 is freed from its ground connection when the normal carrier of 51 kilocycles is being received. When the shifted carrier is received, resistor 51 is grounded and forms substantially a short circuit around the series combination of resistor 50 and the negative 48-volt source. In addition, pulsing relay 52 is balanced so that, in the event of a momentary carrier failure, its armature remains in the position that it is in at the time of the failure. In this manner the signaling path remains unaffected by either momentary variations in level or momentary failure of the received carrier.

In addition to being connected to resistance bridge 23, the output side of expandor 40 is connected to a highly selective band-pass filter 67. Filter 67 is sharply tuned to 200 cycles in order to avoid shunting down the voice-frequency transmission but still pass a 200-cycle tone demodulated from the incoming carrier. The output side of filter 67 is connected, in turn, through a two-stage transistor amplifier made up of an n-p-n transistor 68 and a p-n-p transistor 69 to the operating coil of battery-reversing relay 48. From the output side of filter 67, one lead is connected directly to the base electrode of transistor 68, while the other is returned to a negative 20-volt D.-C. source. The emitter electrode of transistor 68 is connected through a resistor 70 to a negative 20-volt D.-C. source and is bypassed to ground by a condenser 71.

The collector electrode of transistor 68 in the two-stage transistor amplifier is returned to ground through the series combination of a pair of resistors 72 and 73 which is, in turn, bypassed by a condenser 74. The common point between resistors 72 and 73 is connected to the base electrode of second-stage transistor 69. The emitter electrode of transistor 69 is grounded and the collector is connected through the operating coil of battery-reversing relay 48 to a negative 20-volt D.-C. source. A diode 75, poled for easy current flow from the collector electrode of transistor 69 toward the D.-C. source, is connected directly across the operating coil of relay 48.

Figure 4:
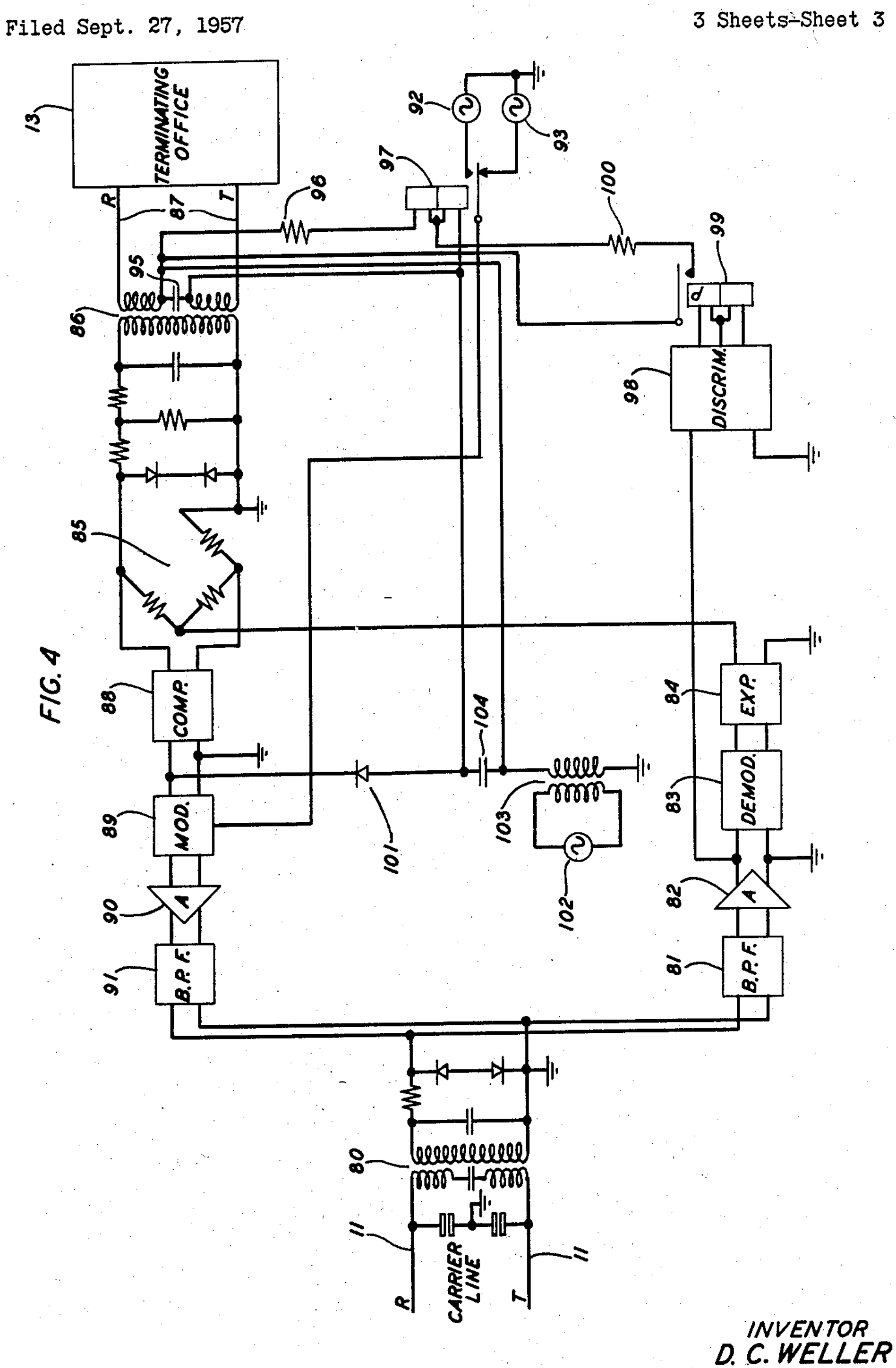
Fig. 4 is a detailed diagram of a carrier terminal embodying the invention used at the terminating central office in the exchange trunk carrier system shown in Fig. 1.

Fig. 4 illustrates in detail the carrier terminal used at the terminating central office 13 in the embodiment of the invention shown in Fig. 1 to provide the other end of the carrier link. The other carrier terminals at the terminating office are similar but operate on their own carrier frequencies. Carrier trunk 11 is coupled through a line transformer 80 to a band-pass receiving channel filter 81 having, by way of example, a pass band of from 9 to 15 kilocycles. Connected in tandem with channel filter 81 in the incoming signal path of the carrier terminal are a receiving amplifier 82, a demodulator 83, and an expandor 84. The output side of expandor 84 is connected to one pair of conjugate terminals of a four-terminal resistance bridge 85. The terminals forming one arm of resistance bridge 85 are coupled through a transformer 86 and a balanced voice-frequency trunk 87 to the terminating central office 13.

Between carrier line 11 and band-pass channel filter 81, the carrier terminal illustrated in Fig. 4 is provided with a high voltage surge protection circuit which is substantially the same as that shown in Fig. 3. Between resistance bridge 85 and voice line transformer 86, the terminal is provided with a high voltage protection circuit substantially the same as that shown between the resistance bridge 23 and transformer 22 in Fig. 3.

The carrier terminal of Fig. 4 is provided with an outgoing transmission path between resistance bridge 85 and carrier line 11, which is made up, in succession, of a compressor 88, a modulator 89, a transmitting amplifier 90, and a band-pass transmitting channel filter 91. Filter 91 has, by way of example, a pass band of from 45 to 51 kilocycles, matching that of receiving filter channel 37 in Fig. 3. Carrier is supplied to modulator 89 from either of two carrier oscillators 92 and 93.

Unlike the carrier equipment at originating office 12, for revertive pulsing it is necessary for the carrier equipment at terminating office 13 to open or close the voice loop in response to signal pulses received from the originating office, detect the presence or absence of battery on voice trunk 87, and detect battery reversal on voice trunk 87. The carrier terminal illustrated in Fig. 4 must, in other words, be able to transmit three signaling states, at least two of which have relatively severe speed requirements, and be able to receive and utilize two signaling states. To transmit two of the states in the required pulse form, the terminal illustrated in Fig. 4 is arranged, in accordance with the invention, to transmit its shifted carrier, e.g., 51 kilocycles, when there is no D.-C. applied to voice line 87 and to transmit its normal carrier, e.g., 48 kilocycles, when battery is applied across voice line 87 in either direction. The third state, indicating battery reversal, has less stringent speed requirements and is transmitted by applying a tone below the voice band in frequency to the modulating signal input to modulator 89 only for battery of one polarity. To utilize the states received from the originating office, the carrier terminal shown in Fig. 4 open-circuits voice line 87 when the normal or 12-kilocycle carrier is received and terminates it in a relatively low impedance when the shifted or 15-kilocycle carrier is received.

In Fig. 4, the office-side winding of transformer 86 is divided and the two halves are separated by a series condenser 95, leaving the A.-C. transmission path between them undisturbed. From the half of the winding on the R side of voice line 87, connection is made through a large resistor 96 to one end of the operating coil of a monitoring relay 97. Monitoring relay 97 has a single armature which is connected directly to modulator 89 and has both a front and a back contact. The front contact is connected to ground through the normal or 48-kilocycle carrier source 92, while the back contact is connected to ground through the shifted or 51-kilocycle carrier source 93. The other end of the operating coil of monitoring relay 97 is connected to the T half of the office-side winding of transformer 86, and the armature is connected to the carrier input terminal of modulator 89.

To open and close the voice loop in response to received carrier frequency shifts, the carrier terminal illustrated in Fig. 4 is provided with a frequency discriminator 98. Discriminator 98 is generally like the frequency discriminator shown in Fig. 3 but is tuned to respond to the normal and shifted carrier frequencies transmitted from the carrier terminal at the originating central office. The input side of discriminator 98 is connected to the output side of receiving amplifier 82 and its output side is connected to the operating coil of a pulsing relay 99. Pulsing relay 99 has a single armature which is connected to the R side of voice trunk 87 and a front contact which is connected through a small resistor 100 to an intermediate tap on the operating coil of monitoring relay 97. Pulsing relay 99 is polarized so that it operates only in response to the normal carrier. When a shifted carrier is received, its armature remains clear of its front contact.

Signaling information specifying battery reversal is transmitted by the carrier terminal in Fig. 4 by a keying circuit having a diode 101 as its principal component. A 200-cycle oscillator 102 is connected across the primary winding of a transformer 103, the secondary winding of which is connected from the R side of voice line 87 to ground. The T side of voice line 87 is connected to the anode of diode 101. A capacitor 104, large enough to pass 200 cycles with little attenuation, is connected between the ungrounded side of the secondary winding of transformer 103 and ground, and the cathode of diode 101 is connected to the high potential side of the modulating signal input circuit of modulator 89.

The operation of an embodiment of the invention employing the carrier terminals illustrated in Figs. 3 and 4 may best be described by tracing the flow of revertive pulsing information back and forth between the two terminals. To summarize, either an open circuit or a short circuit termination, with respect to D.-C., must be established on the voice trunk at terminating office 13 in response to the same condition at originating office 12 and either battery or a short circuit must be established across the voice trunk at originating office 12 in response to the same condition at terminating office 13, and a battery polarity corresponding to that across the voice trunk at terminating office 13 must be established at originating office 12 whenever the battery connection exists at terminating office 13.

When voice trunk 21 in Fig. 3 is terminated in a high impedance, there is no D.-C. continuity through the negative 48-volt D.-C. source and the operating coil of monitoring relay 49. Monitoring relay 49 remains released under such conditions and a so-called shifted carrier of 15 kilocycles is supplied to modulator 28. When the 15-kilocycle shifted carrier is received by the carrier terminal shown in Fig. 4, polarized pulsing relay 99 remains released. The only D.-C. path between the R and T sides of voice trunk 87 is then through resistor 96, which is large enough to look like a substantially open circuit to terminating office 13.

When the termination on voice trunk 21 in Fig. 3 shifts to a low impedance, on the other hand, the present invention permits the termination to be reconstructed on voice trunk 87 at terminating office 13 in Fig. 4 substantially instantaneously and with no measurable interference in the operation of the other carrier channels. A low impedance across voice trunk 21 establishes D.-C. continuity through the R and T windings on the office side of transformer 22, armatures 46 and 47 of battery reversing relay 48, the operating coil of monitoring relay 49, resistor 50, and the negative 48-volt D.-C. source. The relative magnitudes of resistors 50 and 51 are such that relay 49 is able to monitor the condition of voice line 21 regardless of the condition of pulsing relay 52. Monitoring relay 49 thus operates, transferring the connection from modulator 28 to the 15-kilocycle shifted carrier oscillator. This shifted carrier frequency is received at the terminating office carrier terminal at the other end of carrier trunk 11, causing polarized pulsing relay 99 to operate and establish a relatively low D.-C. resistance across voice line 87.

The transmission of signaling information in the other direction over carrier trunk 11 is somewhat similar. When voice line 87 is terminated in a short circuit by terminating office 13 in Fig. 4, no current flows through the operating coil of monitoring relay 97. Its armature is therefore released, and a shifted carrier of 51 kilocycles is supplied to modulator 89 from carrier source 93. At the other end of carrier trunk 11, a received carrier of 51 kilocycles causes no response by pulsing relay 52 and resistor 51 is left providing a low impedance shunt around resistor 50 and the negative 48-volt D.-C. source. To originating office 12, voice trunk 21 thus appears to be terminated in a substantially short circuit.

When battery, usually in the form of a negative 48-volt source, is applied to either side of voice trunk 87 by terminating office 13, current flows through the operating coil of monitoring relay 97. This relay, like monitoring relay 49 in Fig. 3, is connected to monitor the condition of trunk 87 regardless of the condition of pulsing relay 99. When monitoring relay 97 in Fig. 4 operates, a normal carrier of 48 kilocycles is supplied from carrier source 93 to modulator 89. When received at the originating office carrier terminal, this normal carrier causes the armature pulsing relay 52 to open its back contact, removing the ground connection from resistor 51. To originating office 12, the voice trunk 21 thus appears to be terminated by the negative 48-volt D.-C. source, the polarity of the termination depending upon the condition of battery reversing relay 48.

As has already been pointed out, the transmission of battery-reversal information from terminating office 13 to originating office 12 does not have nearly as stringent speed requirements as the transmission of the other aspects of voice trunk termination that have just been described. It may, therefore, be supplied to modulator 89 in Fig. 4 in the form of a tone either just outside of the normal speech band and used to modulate the amplitude of the transmitted carrier whenever the D.-C. termination of voice trunk 87 has a predetermined polarity. In the illustrated arrangement, that polarity provides a negative potential on the R side of voice trunk 87 and ground on the T side. For the opposite polarity, the action of diode keyer 101 prevents the application of the tone to modulator 89.

When negative battery is connected to the R side of voice frequency trunk 87 in Fig. 4, the direction of the current that ends to flow through the office-side winding of transformer 86, the secondary winding of transformer 103, and the input impedance of modulator 89, is such as to forward bias diode 101. The 200-cycle output from oscillator 102 is thus connected to modulator 89. In Fig. 3, battery-reversing relay 48 operates when the 200-cycle tone is recovered from expandor 40. Armature 46 thus connects the R side of voice frequency trunk 21 through the operating coil of monitoring relay 49 and resistor 50 to the negative 48-volt D.-C. source and armature 47 connects the T side to ground, reproducing the termination on voice trunk 87 at the terminating office.

When negative battery is connected to the T side of voice line 87 in Fig. 4, the direction of the resulting current flow back biases diode keyer 101, blocking 200-cycle current from oscillator 104 from the input circuit of modulator 89. When this 200-cycle tone is not received from expandor 40 in Fig. 3, battery-reversing relay 48 releases. Armature 46 then grounds the R side of voice frequency trunk 21 and armature 47 connects the T side to the negative 48-volt D.-C. source.

It is to be understood that the above-described arrangements are illustrative of the application of the principles of the invention. Numerous other arrangements may be devised by those skilled in the art without departing from the spirit and scope of the invention.

What is claimed is:

1. In a carrier telephone system interconnecting a pair of central offices, means to generate a plurality of carrier waves having respective frequencies spaced a substantially equal distance apart from one another in the frequency spectrum, each of said carrier waves providing a communication channel between said central offices, means to amplitude modulate a voice frequency telephone message wave onto each of said carrier waves, means to limit each of said channels to substantially the same predetermined frequency bandwidth, and means to transmit signaling information in pulse form between said central offices with maximum speed and signal-to-noise advantage which comprises means to shift the frequency of each of said carrier waves selectively in response to signaling pulses by an integral fraction of the interchannel carrier spacing which is equal to at least half of the bandwidth of each of said channels.

2. In a carrier telephone system interconnecting a pair of central offices, means to generate a plurality of carrier waves having respective frequencies spaced a substantially equal distance apart from one another in the frequency spectrum, each of said carrier waves providing a communication channel between said central offices, means to amplitude modulate a voice frequency telephone message wave onto each of said carrier waves to provide both upper and lower sidebands, means to limit each of said channels to substantially the same predetermined frequency bandwidth encompassing both of said sidebands, and means to transmit signaling information in pulse form between said central offices with maximum speed and signal-to-noise advantage which comprises means to shift the frequency of each of said carrier waves selectively in response to signaling pulses by an amount substantially equal to $S/n$, where S is the carrier spacing between adjacent channels in said system, $n$ is an integer greater than unity, and $S/n$ is equal to or greater than one-half of the bandwidth of each of said channels.

3. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwidth encompassing both of said sidebands and means to transmit signaling information in pulse form in at least one direction between said central offices with maximum speed and signal-to-noise advantage which comprises means at at least one of said central offices to shift the frequency of each of the outgoing carrier waves selectively in response to signaling pulses by an integral fraction of the interchannel carrier spacing which is equal to at least half of the bandwidth of each of said channels.

4. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwidth encompassing both of said sidebands, and means to transmit signaling information in pulse form in at least one direction between said central offices with maximum speed and signal-to-noise advantage which comprises means at at least one of said central offices to shift the frequency of each of the outgoing carrier waves selectively by an amount substantially equal to one-half of the bandwidth of each of said channels.

5. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwidth encompassing both of said sidebands, and means to transmit signaling information in pulse form from one to the other of said central offices with maximum speed and signal-to-noise advantage which comprises means at the transmitting central office to shift the frequency of each of the outgoing carrier waves selectively by an amount substantially equal to $S/n$, where S is the carrier spacing between adjacent channels in said system, $n$ is an integer greater than unity, and $S/n$ is equal to or greater than one-half of the bandwidth of each of said channels, and means at the receiving central office to detect a shift of any of the carriers received from the transmitting central office and to reconstruct in pulse form the signaling information applied to the transmitting central office.

6. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwidth encompassing both of said sidebands, and means to transmit signaling in pulse form from one to the other of said central offices with maximum speed and signal-to-noise advantage which comprises means at the transmitting central office to shift the frequency of each of the outgoing carrier waves selectively by an amount substantially equal to one-half of the bandwidth of each of said channels, and means at the receiving central office to detect a shift of any of the carriers received from the transmitting central office and to reconstruct in pulse form the signaling information applied to the transmitting central office.

7. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwith encompassing both of said sidebands, and means to transmit signaling information in pulse form from one to the other of said central offices over each of said channels with maximum speed and signal-to-noise advantage without introducing crosstalk into the remaining channels which comprises, in each channel, switching means at the transmitting central office to shift the frequency of the outgoing carrier wave during each signaling pulse by an amount substantially equal to $S/n$, where S is the carrier spacing between adjacent channels in said system, $n$ is an integer greater than unity, and $S/n$ is equal to or greater than one-half of the bandwidth of each of said channels, a frequency discriminator at the receiving central office connected to detect shifts in the received carrier frequency, and switching means at the receiving central office to reconstruct in pulse form from the output of said frequency discriminator the signaling information applied to the transmitting central office.

8. In a carrier telephone system interconnecting a pair of central offices, means to generate a plurality of carrier waves having respective frequencies spaced a substantially equal distance apart from one another in the frequency spectrum, half of said carrier waves providing communication channels in one direction and the other half of said carrier waves providing communication channels in the other direction between central offices, means to amplitude modulate a voice frequency telephone message onto each of said carrier waves at its originating office to provide both upper and lower sidebands, means to limit each of said channels to substantially the same predetermined frequency bandwidth encompassing both of said sidebands, and means to transmit signaling information in pulse form from one to the other of said central offices over each of said channels with maximum speed and signal-to-noise advantage without introducing crosstalk into the remaining channels which comprises, in each channel, switching means at the transmitting central office to shift the frequency of the outgoing carrier wave during each signaling pulse by an amount substantially equal to one-half of the bandwidth of each of said channels, a frequency discriminator at the receiving central office connected to detect shifts in the received carrier frequency, and switching means at the receiving central office to reconstruct in pulse form from the output of said frequency discriminator the signaling information applied to the transmitting central office.

References Cited in the file of this patent

UNITED STATES PATENTS

| | | |
|---|---|---|
| 2,403,385 | Loughlin | July 2, 1946 |
| 2,510,271 | Almquist | June 6, 1950 |
| 2,511,204 | Goldstine | June 13, 1950 |
| 2,626,319 | Cheek et al. | Jan. 20, 1953 |
| 2,654,885 | Wilmotte | Oct. 6, 1953 |
| 2,763,726 | Weller | Sept. 18, 1956 |
| 2,775,647 | Ensink | Dec. 25, 1956 |